Dec. 26, 1967   J. E. DORNFELD   3,360,701
MICA CAPACITOR
Filed Aug. 29, 1966
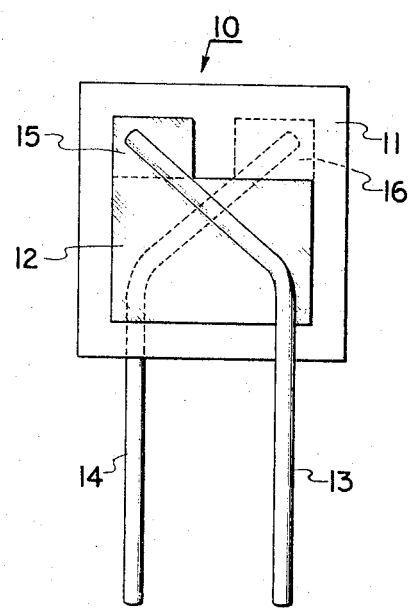

United States Patent Office 3,360,701
Patented Dec. 26, 1967

3,360,701
MICA CAPACITOR
John E. Dornfeld, Mequon, Wis., assignor to Sprague Electric Company, North Adams, Mass., a corporation of Massachusetts
Filed Aug. 29, 1966, Ser. No. 575,742
3 Claims. (Cl. 317—258)

ABSTRACT OF THE DISCLOSURE

Lead attachments to electrodes which are in capacitive overlap on opposite surfaces of a mica dielectric are made to tab portions which extend from a common end of the electrodes in non-overlapping relationship.

---

The present invention relates to mica capacitors and more particularly to single layer mica dielectric capacitors.

Mica capacitors of the prior art are primaily of the stacked type. With this constuction attachment of lead and terminal members to the proper electrode surfaces is relatively simple. According to conventional means, the electrode foils are arranged so as to extend beyond the edge of the dielectic layers in the proper order; or alternatively, tab-type foils are inserted between the layers when a metallized dielectric is used. These extended foil members are then connected to the proper terminals by placing them in contact with opposite sides of clamping apparatus which serves the dual purpose of holding the stack together and acting as current conduit between the terminals and foils. Thus lead contact to stacked capacitors poses no problem until component density and connection resistivity become important.

Clamp and foil connecting means are generally of their very nature extremely bulky particularly in areas where component density is of prime importance. In addition to physical bulk, clamping and other mechanical types of connections possess the disadvantage of providing a connective interface whose resistivity is very high and approaches the ideal value of 1 only with extremely large areas of contact. Thus, although clamp arrangements are fine where the above difficulties are not critical there are areas where their usage is not practical.

Recently, a need has arisen in certain specialized areas for extremely thin capacitors having exceptional capacitance characteristics. The majority of these capacitors are presently produced using single layer metallized ceramic dielectrics. The high and fixed dielectric constant, high Q and other well known electrical properties as well as the ability to be formed into very thin layers, make mica most suitable to these thin layer precision applications.

The problem then arises to connect the lead members directly to the electrode surfaces on either face of the single mica dielectric layer. The clamp and foil method although feasible, is not at all practical. The clamp and foil members increase the size of the unit to a point where the advantages of using extremely thin mica dielectrics are lost. Furthermore, large connection resistivity values can become critical in such small capacitor units.

It is well known that mica delaminates readily, therefore, any bond, no matter how secure to the surface lamina, can readily cause delamination. Delamination may also be caused when mechanical stresses occur in the attachment system, the top lamina becoming detached with the bonding materials.

The present invention overcomes the above difficulties by applying ceramic capacitor techniques to achieve a direct connection of lead wires to the electrodes of a single mica dielectric layer capacitor, which connection provides a good electrical and a secure mechanical contact.

It is therefore an object of the present invention to provide a thin mica dielectric capacitor suitable for use in high component density applications.

It is another object of the present invention to provide a thin mica capacitor having lead wires attached to its electrode surfaces by ohmic and non-mechanical connecting means.

Other objects and advantages of the present invention will be made obvious to those skilled in the art by the following description when considered in relation to the accompanying drawing which represents a plan view of an unencapsulated thin mica capacitor of this invention.

According to the present invention there is provided an electrical capacitor comprising a stack of one or more mica dielectric layers having electrodes of a conductive metal deposited directly upon the mica dielectric layers, the uppermost and lowermost electrodes having ohmically and non-mechanically attached to their faces metallic lead wires of the type commonly used in electrical assemblies.

More particularly, the invention provides an encapsulated electrical capacitor comprising a single layer mica dielectric and two conductive metal electrodes deposited upon opposite surfaces of the mica, said electrodes having connective leads attached by solder or weld to portions of their surfaces which extend beyond the active capacitance area and are supported upon marginal portions of the dielectric substrate. In a preferred embodiment, the connective leads consist of wire leads which extend diagonally across the face of the electrode from their point of contact with the electrode tabs, and then in any convenient or preferred configuration.

The drawing shows a capacitor 10 according to the present invention before any protective covering or encapsulating material has been applied. The mica dielectric 11 is coated on both sides with conductive metal electrodes 12, only one of which is visible in the figure. Attached to the respective electrode members 12 are lead wires 13 and 14. The actual connection between the lead wire 13 and electrode 12 occurs in electrode tab portion 15 which extends beyond the active capacitive overlap of the respective electrodes 12. Connection of lead wire 13 to electrode portion 15 is obtained by any conventional technique.

The contact between lead wire 14 and the tab portion 16 of the electrode 12 on the reverse side of the capacitor, shown as a dotted area in the drawing, is similarly achieved.

The tab portions 15 and 16, being at opposite edges of the dielectric surface, have no active capacitance area therebetween. Thus, should delamination of the mica dielectric 11 occur during asembly due to thermal stress, or after assembly due to mechanical stress, no variation in the unit capacitance is effected.

In the preferred embodiment, encapsulation is performed as soon as possible after the connection of the wire leads to the electrodes. In this manner, the likelihood of delamination due to the application of mechanical stress is reduced. The encapsulating material may consist of any material suitable for that purpose. Epoxy encapsulating resins are preferred, though not demanded.

It should be noted that leads 13 and 14 are of the crossover type, i.e. they are secured at one edge and then lie diagonally across the electrode surface from whence they may then extend in any preferred configuration. This structure serves a dual purpose in that it provides increased contact between the electrode and the lead and also provides additional mutual support and strength to both the lead and the capacitor structures. The leads may, however, be of any type configuration suitable to the ultimate capacitor application. Conventional straight wire leads or even foil leads are practicable.

As mentioned above, several techniques may be used to secure the leads to the electrodes. These include soldering, welding or the application of conductive epoxy resin whichever is more practical and appropriate. In the preferred embodiment, a simple solder connection is used. Such soldering provides a good secure bond while not producing excessive thermal or mechanical strain.

Once the leads have been secured in position the capacitance of the unit may be adjusted downward using the conventional abrasive technique of removing active conductor area.

Since it is obvious that many changes and modifications can be made in the above described details without departing from the nature and spirit of the invention, it is to be understood that the invention is not limited to said details except as set forth in the appended claims.

What is claimed is:

1. An electrical capacitor comprising a mica dielectric layer having conductive metal electrodes deposited upon opposing planar surfaces thereof; leads attached to portions of the electrode surfaces which extend beyond the active capacitance area between the electrodes, the leads extend across the electrode surface from the attachment area, the portions lie out of registration from a common end of the active capacitance area in a non-overlapping and electrically neutral configuration such that dielectric degeneration in the lead attachment area does not cause a corresponding capacitance variation.

2. The capacitor of claim 1 wherein the leads extend diagonally across the face of the electrode surface from the attachment area.

3. The capacitor of claim 1 encapsulated in a protective coating.

References Cited

UNITED STATES PATENTS

| 2,235,489 | 3/1941 | Rath | 317—258 |
| 3,111,612 | 11/1963 | Lehmann | 317—242 |
| 3,229,173 | 1/1966 | McHugh | 317—242 X |

FOREIGN PATENTS

| 113,004 | 4/1941 | Australia. |
| 880,249 | 10/1961 | Great Britain. |

LEWIS H. MYERS, *Primary Examiner.*

G. GOLDBERG, *Assistant Examiner.*